US010432578B2

(12) United States Patent
Hooda et al.

(10) Patent No.: US 10,432,578 B2
(45) Date of Patent: Oct. 1, 2019

(54) CLIENT ADDRESS BASED FORWARDING OF DYNAMIC HOST CONFIGURATION PROTOCOL RESPONSE PACKETS

(71) Applicant: Cisco Technology, Inc., San Jose, CA (US)

(72) Inventors: Sanjay Kumar Hooda, Pleasanton, CA (US); Sandesh Kumar Narappa Bheemanakone, Milpitas, CA (US); Shivangi Sharma, Los Gatos, CA (US); Atri Indiresan, Sunnyvale, CA (US); Kaushik Kumar Dam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 15/276,818

(22) Filed: Sep. 27, 2016

(65) Prior Publication Data

US 2018/0091471 A1    Mar. 29, 2018

(51) Int. Cl.
*H04L 29/12*     (2006.01)
*H04L 12/46*     (2006.01)
*H04L 12/24*     (2006.01)

(52) U.S. Cl.
CPC ...... *H04L 61/2015* (2013.01); *H04L 12/4633* (2013.01); *H04L 41/046* (2013.01); *H04L 61/6022* (2013.01)

(58) Field of Classification Search
CPC ............. H04L 41/0213; H04L 41/0226; H04L 41/044; H04L 41/084; H04L 41/0883; H04L 41/5054; H04L 43/04; H04L 43/12; H04L 45/02; H04L 45/64; H04L 47/215; H04L 47/50; H04L 47/521; H04L 47/6225; H04L 47/623; H04L 61/106; H04L 61/2007; H04L 61/251; H04L 63/0823; H04L 63/083; H04L 63/10; H04L 67/28; H04L 69/16; H04L 69/167; H04L 69/168; H04L 61/2015; H04L 12/2856; H04L 12/2859; H04L 12/4641; H04L 29/12216; H04L 41/12; H04L 12/2801; H04L 47/10; H04L 47/20; H04L 47/2416; H04L 47/2441; H04L 47/32; H04L 2012/5605;
(Continued)

(56) References Cited

U.S. PATENT DOCUMENTS

6,456,624 B1    9/2002  Eccles et al.
7,152,117 B1   12/2006  Stapp et al.
(Continued)

*Primary Examiner* — Djenane M Bayard
(74) *Attorney, Agent, or Firm* — Merchant & Gould P.C.

(57) ABSTRACT

Client address based forwarding of dynamic host configuration protocol response packets may be provided. First, a first relay agent on a first network device may receive a first discovery message associated with a first client device. The first discovery message may include a first discovery message identifier field comprising a first identifier corresponding to the first client device. The first client device may be associated with a subnet. Then the first relay agent may register, with a map server, the first identifier with an address of the first network device and add a gateway address corresponding to the first relay agent to the first discovery message. Next, the first relay agent may encapsulate the first discovery message and forward the encapsulated first discovery message over a network to a border device.

20 Claims, 3 Drawing Sheets

(58) Field of Classification Search
CPC ....... H04L 2012/5606; H04L 2012/561; H04L 2012/5651; H04L 2012/5679; H04L 47/15; H04L 47/24; H04L 47/2425; H04L 47/2491; H04L 47/70; H04L 47/724
See application file for complete search history.

(56) References Cited

U.S. PATENT DOCUMENTS

| | | | |
|---|---|---|---|
| 7,177,946 B1 | 2/2007 | Kaluve et al. | |
| 7,586,912 B2 * | 9/2009 | Agarwal | H04L 29/1282 370/389 |
| 7,826,400 B2 | 11/2010 | Sakauchi | |
| 7,848,340 B2 | 12/2010 | Sakauchi et al. | |
| 8,339,973 B1 | 12/2012 | Pichumani et al. | |
| 9,374,294 B1 | 6/2016 | Pani | |
| 9,444,634 B2 | 9/2016 | Pani et al. | |
| 2003/0067912 A1 | 4/2003 | Mead et al. | |
| 2003/0115319 A1 | 6/2003 | Dawson et al. | |
| 2004/0103310 A1 | 5/2004 | Sobel et al. | |
| 2005/0010685 A1 | 1/2005 | Ramnath et al. | |
| 2005/0083835 A1 | 4/2005 | Prairie et al. | |
| 2005/0117593 A1 | 6/2005 | Shand | |
| 2005/0175020 A1 | 8/2005 | Park et al. | |
| 2006/0013143 A1 | 1/2006 | Yasuie et al. | |
| 2006/0072461 A1 | 4/2006 | Luong et al. | |
| 2006/0221950 A1 | 10/2006 | Heer | |
| 2006/0227790 A1 | 10/2006 | Yeung et al. | |
| 2006/0268742 A1 | 11/2006 | Chu et al. | |
| 2006/0274647 A1 | 12/2006 | Wang et al. | |
| 2006/0280179 A1 | 12/2006 | Meier | |
| 2007/0047463 A1 | 3/2007 | Jarvis et al. | |
| 2007/0165515 A1 | 7/2007 | Vasseur | |
| 2007/0171814 A1 | 7/2007 | Florit et al. | |
| 2007/0177525 A1 | 8/2007 | Wijnands et al. | |
| 2007/0183337 A1 | 8/2007 | Cashman et al. | |
| 2007/0217415 A1 | 9/2007 | Wijnands et al. | |
| 2008/0031130 A1 | 2/2008 | Raj et al. | |
| 2008/0046571 A1 * | 2/2008 | Tuononen | H04L 61/2015 709/227 |
| 2008/0212496 A1 | 9/2008 | Zou | |
| 2009/0067322 A1 | 3/2009 | Shand et al. | |
| 2009/0094357 A1 | 4/2009 | Keohane et al. | |
| 2009/0161567 A1 | 6/2009 | Jayawardena et al. | |
| 2009/0232011 A1 | 9/2009 | Li et al. | |
| 2009/0238196 A1 | 9/2009 | Ukita et al. | |
| 2010/0020719 A1 | 1/2010 | Chu et al. | |
| 2010/0020726 A1 | 1/2010 | Chu et al. | |
| 2010/0191813 A1 | 7/2010 | Gandhewar et al. | |
| 2010/0191839 A1 * | 7/2010 | Gandhewar | H04L 29/12028 709/220 |
| 2011/0022725 A1 | 1/2011 | Farkas | |
| 2011/0170426 A1 | 7/2011 | Kompella et al. | |
| 2011/0199891 A1 | 8/2011 | Chen | |
| 2011/0199941 A1 | 8/2011 | Ouellette et al. | |
| 2011/0243136 A1 | 10/2011 | Raman et al. | |
| 2011/0280572 A1 | 11/2011 | Vobbilisetty et al. | |
| 2011/0286447 A1 | 11/2011 | Liu et al. | |
| 2011/0299406 A1 | 12/2011 | Vobbilisetty et al. | |
| 2012/0030150 A1 | 2/2012 | McAuley et al. | |
| 2012/0039323 A1 * | 2/2012 | Hirano | H04W 36/385 370/338 |
| 2012/0057505 A1 | 3/2012 | Xue | |
| 2012/0131097 A1 * | 5/2012 | Baykal | H04L 29/12264 709/203 |
| 2012/0300669 A1 | 11/2012 | Zahavi | |
| 2013/0097335 A1 | 4/2013 | Jiang et al. | |
| 2013/0182712 A1 | 7/2013 | Aguayo et al. | |
| 2013/0208624 A1 | 8/2013 | Ashwood-Smith | |
| 2013/0223276 A1 | 8/2013 | Padgett | |
| 2013/0227689 A1 | 8/2013 | Pietrowicz et al. | |
| 2013/0250779 A1 | 9/2013 | Meloche et al. | |
| 2013/0250951 A1 | 9/2013 | Koganti | |
| 2013/0276129 A1 | 10/2013 | Nelson et al. | |
| 2013/0311663 A1 | 11/2013 | Kamath et al. | |
| 2013/0322446 A1 | 12/2013 | Biswas et al. | |
| 2013/0329605 A1 | 12/2013 | Nakil et al. | |
| 2013/0332399 A1 | 12/2013 | Reddy et al. | |
| 2013/0332577 A1 | 12/2013 | Nakil et al. | |
| 2013/0332602 A1 | 12/2013 | Nakil et al. | |
| 2014/0016501 A1 | 1/2014 | Kamath et al. | |
| 2014/0086097 A1 | 3/2014 | Qu et al. | |
| 2014/0098815 A1 * | 4/2014 | Mishra | H04L 45/021 370/390 |
| 2014/0146817 A1 | 5/2014 | Zhang | |
| 2014/0149819 A1 | 5/2014 | Lu et al. | |
| 2014/0219275 A1 | 8/2014 | Allan et al. | |
| 2014/0269712 A1 | 9/2014 | Kidambi | |
| 2015/0016277 A1 | 1/2015 | Smith et al. | |
| 2015/0092593 A1 | 4/2015 | Kompella | |
| 2015/0124586 A1 | 5/2015 | Pani | |
| 2015/0124587 A1 | 5/2015 | Pani | |
| 2015/0124629 A1 | 5/2015 | Pani | |
| 2015/0124642 A1 | 5/2015 | Pani | |
| 2015/0124644 A1 | 5/2015 | Pani | |
| 2015/0124654 A1 | 5/2015 | Pani | |
| 2015/0127701 A1 | 5/2015 | Chu et al. | |
| 2015/0188771 A1 | 7/2015 | Allan et al. | |
| 2016/0212778 A1 * | 7/2016 | Grootwassink | H04L 67/1095 |
| 2017/0346686 A1 * | 11/2017 | Mudigonda | H04L 41/0806 |

* cited by examiner

CLIENT ADDRESS BASED FORWARDING OF DYNAMIC HOST CONFIGURATION PROTOCOL RESPONSE PACKETS

TECHNICAL FIELD

The present disclosure relates generally to forwarding dynamic host configuration protocol response packets.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Client address based forwarding of dynamic host configuration protocol response packets may be provided. First, a first relay agent on a first network device may receive a first discovery message associated with a first client device. The first discovery message may include a first discovery message identifier field comprising a first identifier corresponding to the first client device. The first client device may be associated with a subnet. Then the first relay agent may register, with a map server, the first identifier with an address of the first network device and add a gateway address corresponding to the first relay agent to the first discovery message. Next, the first relay agent may encapsulate the first discovery message and forward the encapsulated first discovery message over a network to a border device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks comprise overlay and underlay. The underlay deals with connectivity between fabric network devices and the overlay deals with user traffic transiting the fabric network. The fabric network overlay may comprise functional components such as fabric edge (FE) devices, fabric intermediate devices, fabric border (FB) devices, and a map resolver/server.

In the fabric network overlay, FE devices may comprise, for example, Locator/ID Separation Protocol (LISP) xTR nodes and FB devices may comprise, for example, LISP pxTR nodes. End points (e.g., client devices including hosts) may be attached to the FE devices. The end points may be in endpoint identification (EID) space with each endpoint having an EID. Each device in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

FB devices may connect the fabric network to the native routing domain. FB devices may be configured, for example, as LISP pxTR nodes and may provide a default gateway service to the FE nodes. Communication may happen through the FB device configured, for example, as a LISP pxTR node. When an FE device receives a packet from a local end point destined to a host outside the fabric network in the native routing domain, the FE device may encapsulate and send the packet to the FB device. The FB device may provide, for example, the LISP pxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway IP address to allow for roaming by allowing endpoints to continue using the same gateway IP address. The provided services may also include Layer-3 overlay service and built-in mobility.

Figure 1:
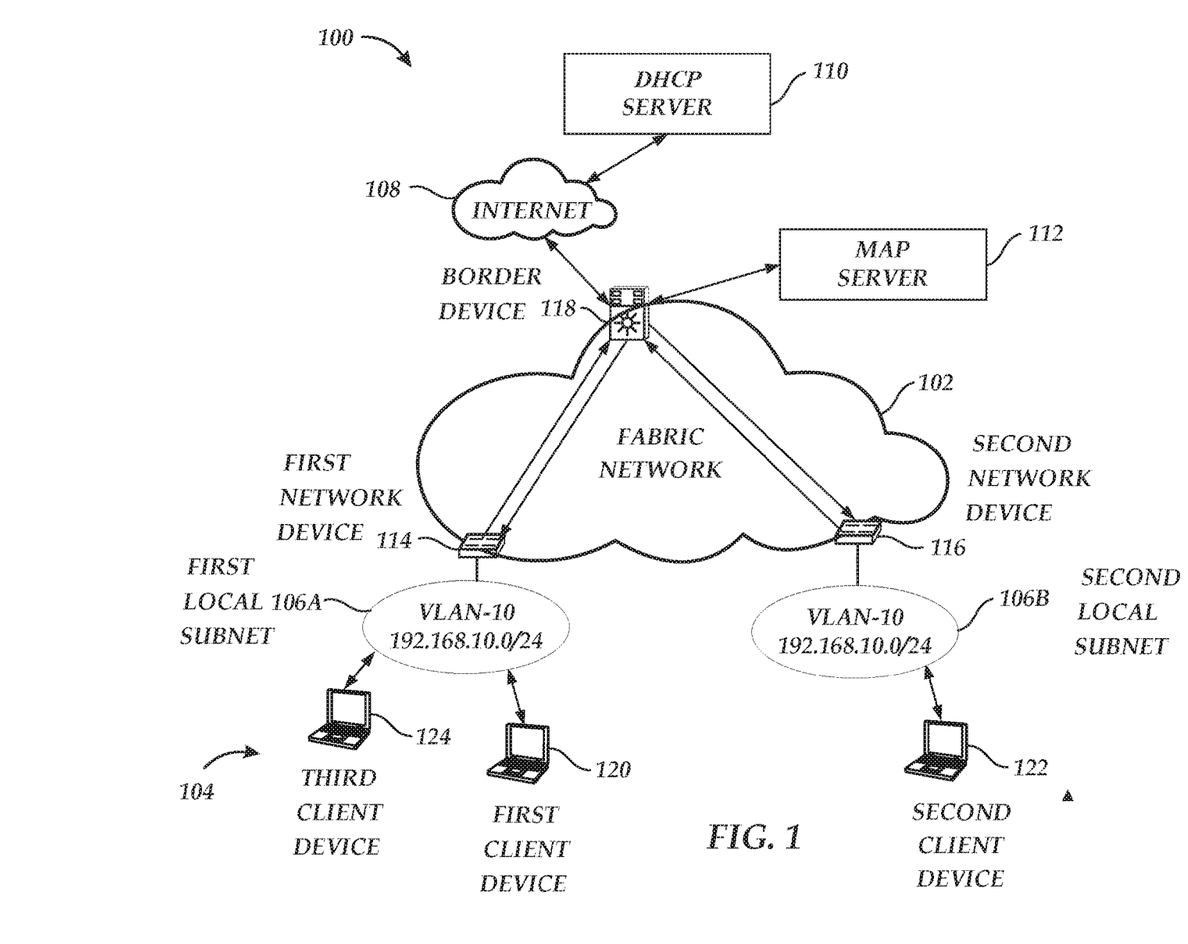
FIG. 1 shows a system for providing client address based forwarding of dynamic host configuration protocol response packets.

FIG. 1 shows a system 100 consistent with embodiments of the disclosure for providing client address based forwarding of dynamic host configuration protocol response packets. As shown in FIG. 1, system 100 may comprise a first network 102, a plurality of client devices 104, a first local subnet 106A, a second local subnet 106B, a second network 108, a dynamic host configuration protocol (DHCP) server 110, and a map server 112. First network 102 may comprise a plurality of network devices including, but not limited to, a first network device 114, a second network device 116, intermediate network devices (not shown), and a border device 118. Plurality of client devices 104 may comprise a first client device 120, a second client device 120, and a third client device 124. First local subnet 106A and second local subnet 106B may be the same subnet stretched across multiple FE devices, for example, first local subnet 106A and second local subnet 106B may be the same subnet stretched across first network device 114 and second network device 116. Second network 108 may comprise a network outside first network 102, for example, the Internet.

The plurality of network devices in network 102 may comprise, but are not limited to, switches and routers for example. Network 102 may comprise any number of network devices. Plurality of client devices 104 may comprise any number of client devices and is not limited to three. Each of plurality of client devices 104 may comprise any type device wishing to communicate over network 102. For example, each of plurality of client devices 104 may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., network 102) through FE devices (e.g., first network device 114 and second network device 116). The traffic may be routed through network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing layer-2 and layer-3 services on top of the underlay. The fabric network may have endpoints (e.g., plurality of client devices 104) connected to it.

Consistent with embodiments of the disclosure, a control plane (e.g., in the overlay of the fabric network) of network 102 may track the location of endpoints (i.e., hosts connected to the fabric network). The end endpoints tracked by the control plane may comprise first client device 120, second client device 122, and third client device 124. First client device 120, second client device 122, and third client device 124 may each have an EID, for example, a media access control (MAC) address, an internet protocol (IP) (e.g., IPv4 or IPv6) address, or any other identifier for the client device connected to the fabric network. First client device 120 may have an EID (e.g., MAC address) of Client_MAC1, second client device 122 may have an EID (e.g., MAC address) of Client_MAC2, and third client device 124 may have an EID (e.g., MAC address) of Client_MAC3.

First client device 120, second client device 122, and third client device 124 may be on a subnet comprising virtual local area network 10 (i.e., VLAN-10) that has a subnet address of 192.168.10.0/24. For example, first client device 120, second client device 120, and third client device 124 may be DHCP clients in a DHCP pool called "fabric_sales_users" having the subnet address of 192.168.10.0/24. The anycast fabric gateway address (e.g., GIADDR) for this subnet may be 192.168.10.1. This subnet may be split into first local subnet 106A and second local subnet 106B and may be stretched across first network device 114 and second network device 116 as shown in FIG. 1. First client device 120 and third client device 124 may be on first local subnet 106A and second client device 120 may be on second local subnet 106B. First network device 114, second network device 116, and border device 118 may have the addresses (e.g., locator addresses) of 1.1.1.1, 2.2.2.2, and 3.3.3.3. DHCP server 110 may have an address (e.g., IP address) of 172.10.1.1.

The fabric network stretched layer-2 service may provide the flexibility to extend the subnet to any part of fabric network. In the example shown in FIG. 1, the same subnet (e.g., first local subnet 106A and second local subnet 106B) may be present in multiple FE devices (e.g., first network device 114 and second network device 116) and may use the same anycast IP address (e.g., 192.168.10.1) as the gateway address. Using an anycast gateway IP address allows endpoints (e.g., first client device 120, second client device 120, and third client device 124) to use the same gateway IP address when intra subnet roaming (e.g., between first local subnet 106A and second local subnet 106B) occurs across the edge of the fabric network.

Using an anycast IP address as a subnet gateway address in the stretched Layer-2 fabric network environment, however, may create a problem when forwarding a DHCP response (i.e., offer) generated from a DHCP server back to a DHCP relay agent in the EID space in the FE devices in conventional systems. For example, in conventional fabric networks, a DHCP client and a DHCP server reside in different subnets and may require a DHCP relay agent to establish communication with the DHCP server. The DHCP server may be located centrally in a data center server network. In a fabric network, the DHCP server may be located in the non EID address space and FE devices may use an FB device as a pxTR to communicate with the DHCP server. Building a DHCP network in a stretched layer-2 fabric network environment may involve running a DHCP relay agent functionality on the FE devices. However, with conventional fabric networks with a stretched subnet Layer-2 environment, there is no process to forward the DHCP response packet from a DHCP server destined to anycast relay agent IP address in the EID space. This is because conventional systems are not able to distinguish between endpoints on the same subnet, but stretched between two or more FE devices.

Embodiments of the disclosure may provide a process for forwarding such DHCP response packets to the anycast relay agent IP address based on the EID of an endpoint (e.g., a MAC address of the client device comprising the endpoint) stored inside the DHCP response packet as, for example, the "CHADDR" field. In other words, embodiments of the disclosure may make DHCP work over the overlay network by querying the CHADDR in the DHCP response packet and forwarding to the right FE device where the endpoint (e.g., client device) is connected.

For example, once border device 118 receives a DHCP response from DHCP server 110 destined to an anycast relay agent IP address in the EID space, border device 118 may extract the address (e.g., MAC address of an endpoint) stored in the "CHADDR" field of the DHCP response packet. Then border device 118 may use the extracted address as an EID and query map server 112 to resolve the locator for this EID. Once border device 118 receives the locator (e.g., RLOC) for this EID, border device 118 may then encapsulate (e.g., LISP encapsulate) the subsequent DHCP response packet with an outer locator set to the resolved RLOC and forward this packet to the proper downstream DHCP relay agent running FE device to which the endpoint with the EID is connected.

Figure 2:
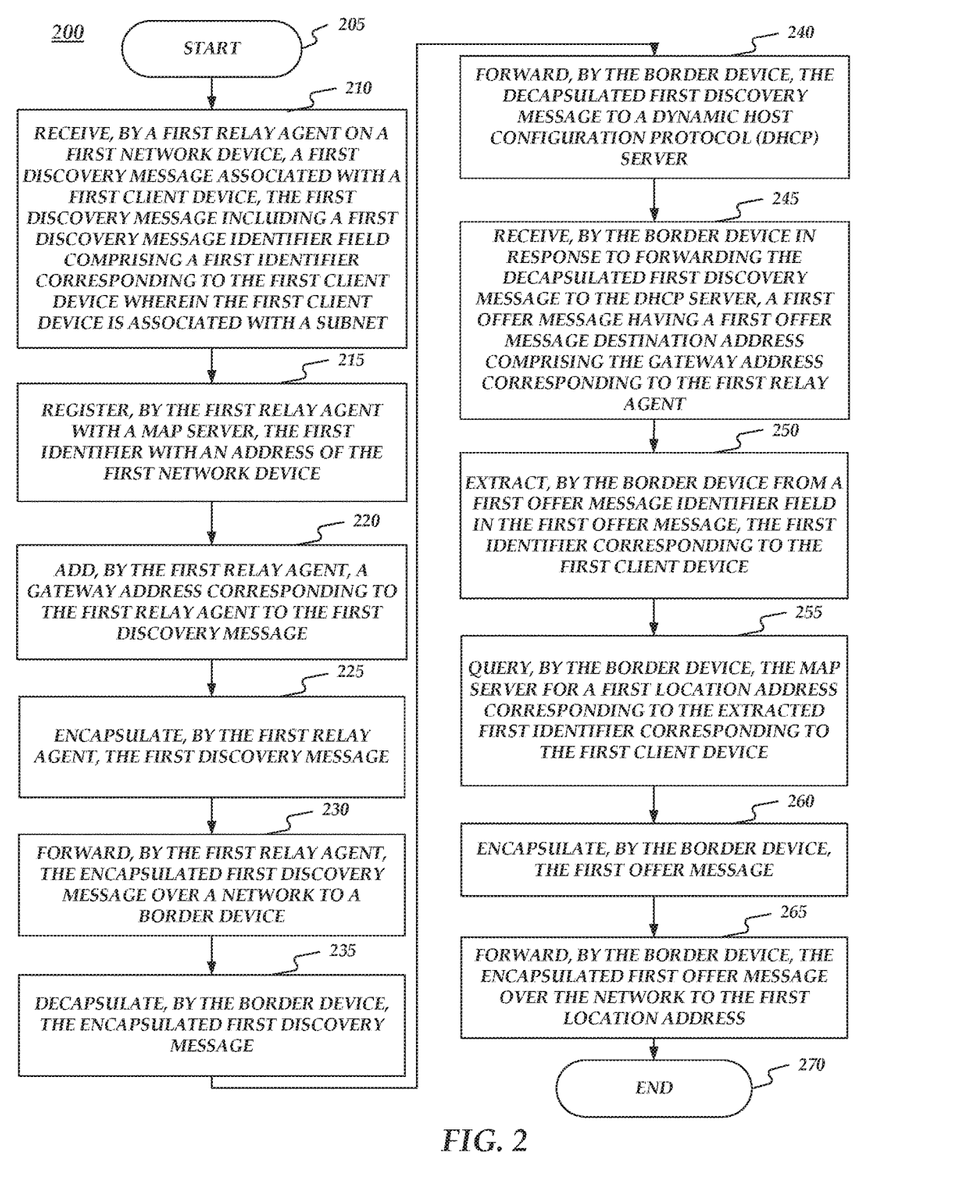
FIG. 2 is a flow chart of a method for providing client address based forwarding of dynamic host configuration protocol response packets.

FIG. 2 is a flow chart setting forth the general stages involved in a method 200 consistent with an embodiment of the disclosure for providing client address based forwarding of dynamic host configuration protocol response packets. Method 200 may be implemented using system 100 as described in more detail above with respect to FIG. 1. Ways to implement the stages of method 200 will be described in greater detail below.

Method 200 may begin at starting block 205 and proceed to stage 210 where a first relay agent running on first network device 114 may receive a first discovery message associated with first client device 120. The first discovery message may include a first discovery message identifier field comprising a first identifier corresponding to first client device 120. First client device 120 may be associated with the subnet though first local subnet 106A. A second relay agent running on second network device 116 may receive a second discovery message associated with second client device 122. The second discovery message may include a second discovery message identifier field comprising a second identifier corresponding to second client device 122. Second client device 122 may be associated with the subnet though second local subnet 106B. For example, first client device 120 and second client device 122 may broadcast DHCP discovery messages on the subnet. The "CHADDR" in the discovery message may be set to the MAC addresses of first client device 120 and second client device 122, for example, Client_MAC1 and Client_MAC2 for first client device 120 and second client device 122, respectively.

From stage 210, where the first relay agent running on first network device 114 receives the first discovery message associated with first client device 120, method 200 may advance to stage 215 where the first relay agent may register with map server 112 the first identifier with an address of first network device 120. For example, first relay agent may register first client device 120's MAC address (e.g., Client_MAC1 address as EID) with its configured locator address of first network device 114 (e.g., 1.1.1.1) to map server 112. Furthermore, second relay agent may register second client device 122's MAC address (e.g., Client_MAC2 address as EID) with its configured locator address of second network device 116 (e.g., 2.2.2.2) to map server 112.

Once the first relay agent registers with map server 112 the first identifier with the address of first network device 120 in stage 215, method 200 may continue to stage 220 where the first relay agent may add a gateway address corresponding to the first relay agent to the first discovery message. For example, at this point, the first relay agent may stores it's anycast IP address (i.e., 192.168.10.1) in the "Relay Agent IP (=Gateway IP=giaddr)" field of the first discovery message to be relayed. In addition, the second relay agent may add a gateway address corresponding to the second relay agent to the second discovery message. For example, at this point, the second relay agent may stores it's anycast IP address (i.e., 192.168.10.1) in the "Relay Agent IP (=Gateway IP=giaddr)" field of the second discovery message to be relayed. The first relay agent's address (i.e., 192.168.10.1) and the second relay agent's anycast IP address (i.e., 192.168.10.1) may be the same because they are both a part of the same subnet.

After the first relay agent adds the gateway address corresponding to the first relay agent to the first discovery message in stage 220, method 200 may proceed to stage 225 where the first relay agent may encapsulate the first discovery message. For example, the first relay agent may LISP encapsulate the first discovery message and the second relay agent may LISP encapsulate the second discovery message.

From stage 225, where the first relay agent encapsulates the first discovery message, method 200 may advance to stage 230 where the first relay agent may forward the encapsulated first discovery message over network 102 to border device 118. For example, first network device 114, running the first relay agent (e.g., a first DHCP relay agent), may receive the first discovery message broadcasted by first client device 120, and unicast it directly to DHCP server 110 over network 102 using, for example, LISP encapsulation. In this example, the first relay agent address may comprise 192.168.10.1 and may be in the EID space. In addition, second network device 116, running the second relay agent (e.g., a second DHCP relay agent), may receive the second discovery message broadcasted by second client device 122, and unicast it directly to DHCP server 110 over network 102 using, for example, LISP encapsulation. In this example, the second relay agent address may comprise 192.168.10.1 and may be in the EID space. The address of DHCP server 110 may comprise 172.10.1.1 and may be in the non EID space.

To establish any communication from EID to non-EID space in the fabric network, border device 118 may be a proxy server and all the packets may be LISP encapsulated and forwarded to border device 118. In other words, the converted unicast first discovery message may be LISP encapsulated and forwarded, for example, to a pxTR enabled fabric border node (i.e., border device 118).

Once the first relay agent forwards the encapsulated first discovery message over network 102 to border device 118 in stage 230, method 200 may continue to stage 235 where border device 118 may decapsulate the encapsulated the first discovery message. For example, border device 118 may decapsulate the LISP encapsulated first discovery packet. In addition, border device 118 may decapsulate the LISP encapsulated second discovery packet.

After border device 118 decapsulates the encapsulated first discovery message in stage 235, method 200 may proceed to stage 240 where border device 118 may forward the decapsulated first discovery message to DHCP server 110. For example, border device 118 may do native forwarding of the decapsulated first discovery message and the decapsulated second discovery message to DHCP server 110 having the address, for example, 172.10.1.1.

From stage 240, where border device 118 forwards the decapsulated first discovery message to DHCP server 110, method 200 may advance to stage 245 where border device 118 may receive, in response to forwarding the decapsulated first discovery message to DHCP server 110, a first offer message having a first offer message destination address comprising the gateway address corresponding to the first relay agent. For example, when DHCP server 110 receives a DHCP discovery message from a client (e.g., first client device 120 or second client 122), DHCP server 110 may choose a network address for the requesting client. A new address may be allocated from DHCP server 110's pool. The pool may be selected based on the subnet from which message was received (if "giaddr" is 0) or on the address of the relay agent (i.e., "giaddr".) In this case, "giaddr" 192.168.10.1 may be used to select the DHCP pool (e.g., "fabric_sales_users"). Then DHCP server 110 may send the DHCP offer message with destination IP address set to relay agent IP address (e.g., 192.168.10.1). As a result, DHCP server 110 may reply to both DHCP offer messages received from the first relay agent and the second relay agent with destination IP address set to the same address, for example, 192.168.10.1. The first offer message destined to anycast a relay agent with IP address 192.168.10.1, for example, may be natively forwarded to border device 118 that may be running pxTR functionality because border device 118 may have advertised itself as the next-hop for the EID prefix 192.168.10.0/24 to steer the EID destined traffic.

Once border device 118 receives the first offer message in stage 245, method 200 may continue to stage 250 where border device 108 may extract, from the first offer message identifier field in the first offer message, the first identifier corresponding to first client device 120. For example, border device 108 may receive the first offer message with destination IP address, for example, 192.168.10.1 belonging to the EID space. For anycast destined EID address 192.168.10.1, pxTR of border device 108 may extract the client MAC address from the "CHADDR" field of the received first offer message.

After border device 108 extracts, from the first offer message identifier field in the first offer message, the first identifier corresponding to first client device 120 in stage 250, method 200 may proceed to stage 255 where border device 108 may query map server 112 for a first location address corresponding to the extracted first identifier corresponding to first client device 120. For example, border device 108 may query map server 112 to resolve the locator address based on the client MAC address. Map server 112 may implement the MAC address EID based on locator query service. Border device 108 may get a response from map server 112 with the locator address as "1.1.1.1" for EID address "Client_MAC1" and locator address "2.2.2.2" for EID address "Client_MAC2".

From stage 255, where border device 108 queries map server 112 for the first location address corresponding to the extracted first identifier corresponding to first client device 120, method 200 may advance to stage 260 where border device 108 may encapsulate the first offer message. For example, border device 108 may LISP encapsulate the first offer message destined, for example, to anycast agent address 192.168.10.1, with the CHADDR field set to Client_MAC1 with outer RLOC as 1.1.1.1 and may forward the first offer message (e.g., with LISP encapsulation) toward first network device 114. Similarly border device 108 may receive the second offer message destined to anycast agent address 192.168.10.1 with the CHADDR field set Client_MAC2. Then border device 108 may query map server 112 with Client_MAC2 as the EID address. Border device 108 may receive a response from map server 112 with locator address as 2.2.2.2. and may forward the second offer message (e.g., with LISP encapsulation) toward second network device 116.

After border device 108 encapsulates the first offer message in stage 260, method 200 may proceed to stage 265 where border device 108 may forward the encapsulated first offer message over network 102 to the first location address. For example, border device 108 may forward the first offer message to first network device 114 that may in turn natively forward it to first client device 120. Similarly, border device 108 may forward the second offer message to second network device 116 that may in turn natively forward it to second client device 122. Once border device 108 forwards the encapsulated first offer message over network 102 to the first location address in stage 265, method 200 may then end at stage 270.

Figure 3:
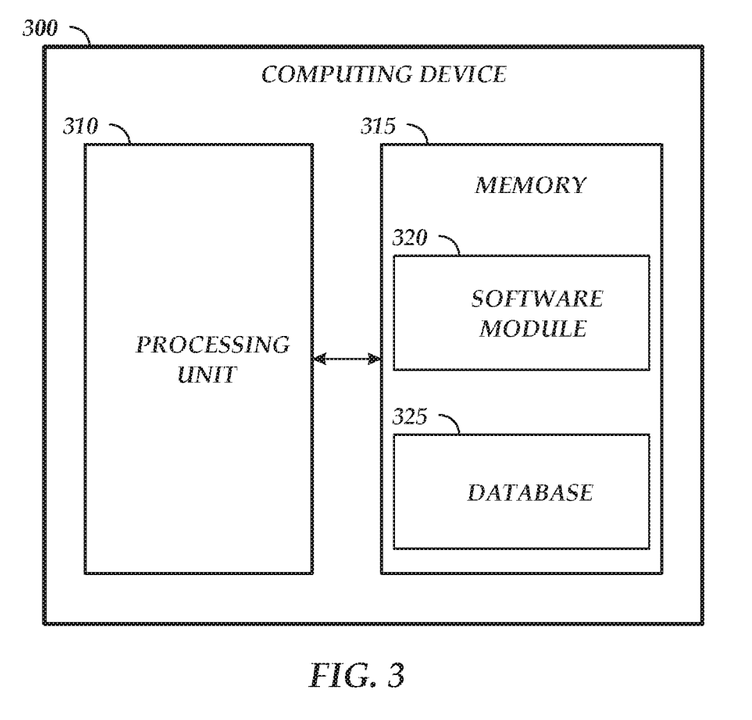
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing client address based forwarding of dynamic host configuration protocol response packets, including for example, any one or more of the stages from method 200 described above with respect to FIG. 2. Computing device 300, for example, may provide an operating environment for any of plurality of client devices 104, DHCP server 110, map server 112, first network device 114, second network device 116, intermediate network devices, and border device 118. Plurality of client devices 104, DHCP server 110, map server 112, first network device 114, second network device 116, intermediate network devices, and border device 118 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, by a first relay agent on a first network device, a first discovery message associated with a first client device, the first discovery message including a first discovery message identifier field comprising a first identifier corresponding to the first client device, wherein the first client device is associated with a subnet;

registering, by the first relay agent with a map server, the first identifier with an address of the first network device;

adding, by the first relay agent, a gateway address corresponding to the first relay agent to the first discovery message, the gateway address being in an Endpoint Identification (EID) space;

encapsulating, by the first relay agent, the first discovery message;

forwarding, by the first relay agent, the encapsulated first discovery message over a network to a border device;

decapsulating, by the border device, the encapsulated first discovery message;

forwarding, by the border device, the decapsulated first discovery message to a dynamic host configuration protocol (DHCP) server having an address not in the EID space;

receiving, by the border device in response to forwarding the decapsulated first discovery message to the DHCP server, a first offer message having a first offer message destination address comprising the gateway address corresponding to the first relay agent and a first offer message identifier field comprising the first identifier;

extracting, by the border device from the first offer message identifier field in the first offer message, the first identifier corresponding to the first client device;

querying, by the border device, the map server for a first location address corresponding to the extracted first identifier corresponding to the first client device;

encapsulating, by the border device, the first offer message; and forwarding, by the border device, the encapsulated first offer message over the network to the first location address.

2. The method of claim 1, further comprising sending, by the first client device, the first discovery message.

3. The method of claim 1, wherein registering the first identifier comprises registering the first identifier comprising a media access control (MAC) address of the first client device.

4. The method of claim 1, wherein receiving the first discovery message comprises receiving the first discovery message wherein the first discovery message identifier field comprises a CHADDR field.

5. The method of claim 1, wherein registering the first identifier with the address of the first network device comprises registering the first identifier with the address of the first network device wherein the address of the first network device comprises a locator address of the first network device.

6. The method of claim 1, wherein registering the first identifier with the address of the first network device comprises registering the first identifier with the address of the first network device wherein the address of the first network device comprises an internet protocol (IP) address of the first network device.

7. The method of claim 1, wherein encapsulating the first discovery message comprises Locator/ID Separation Protocol (LISP) encapsulating the first discovery message.

8. The method of claim 1, wherein forwarding the encapsulated first discovery message over the network comprises forwarding the encapsulated first discovery message over the network comprising a fabric network.

9. The method of claim 1, further comprising:
receiving, by a second relay agent on a second network device, a second discovery message associated with a second client device, the second discovery message including a second discovery message identifier field comprising a second identifier corresponding to the second client device wherein the second client device is associated with the subnet stretched across the first network device and the second network device;
registering, by the second relay agent with the map server, the second identifier with an address of the second network device;
adding, by the second relay agent, a gateway address corresponding to the second relay agent to the second discovery message, the gateway address corresponding to the first relay agent being the same as the gateway address corresponding to the second relay agent;
encapsulating, by the second relay agent, the second discovery message;
forwarding, by the second relay agent, the encapsulated second discovery message over the network to the border device;
decapsulating, by the border device, the encapsulated second discovery message;
forwarding, by the border device, the decapsulated second discovery message to the dynamic host configuration protocol (DHCP) server;
receiving, by the border device in response to forwarding the decapsulated second discovery message to the DHCP server, a second offer message having a second offer message destination address comprising the gateway address corresponding to the second relay agent;
extracting, by the border device from a second offer message identifier field in the second offer message, the second identifier corresponding to the second client device;
querying, by the border device, the map server for a second location address corresponding to the extracted second identifier corresponding to the second client device;
encapsulating, by the border device, the second offer message; and
forwarding, by the border device, the encapsulated second offer message over the network to the second location address.

10. A method comprising:
receiving, by a first relay agent on a first network device, a first discovery message associated with a first client device, the first discovery message including a first discovery message identifier field comprising a first identifier corresponding to the first client device, wherein the first client device is associated with a subnet;
receiving, by a second relay agent on a second network device, a second discovery message associated with a second client device, the second discovery message including a second discovery message identifier field comprising a second identifier corresponding to the second client device, wherein the second client device is associated with the subnet stretched across the first network device and the second network device;
registering, by the first relay agent with a map server, the first identifier with an address of the first network device;
registering, by the second relay agent with the map server, the second identifier with an address of the second network device;
adding, by the first relay agent, a gateway address corresponding to the first relay agent to the first discovery message, the gateway address being in an Endpoint Identification (EID) space;
adding, by the second relay agent, a gateway address corresponding to the second relay agent to the second discovery message, the gateway address corresponding to the first relay agent being the same as the gateway address corresponding to the second relay agent;
encapsulating, by the first relay agent, the first discovery message;
encapsulating, by the second relay agent, the second discovery message;
forwarding, by the first relay agent, the encapsulated first discovery message over a network to a border device;
forwarding, by the second relay agent, the encapsulated second discovery message over the network to the border device;
decapsulating, by the border device, the encapsulated first discovery message; and
forwarding, by the border device, the decapsulated first discovery message to a dynamic host configuration protocol (DHCP) server having an address not in the EID space.

11. The method of claim 10, further comprising:
receiving, by the border device in response to forwarding the decapsulated first discovery message to the DHCP server, a first offer message having a first offer message destination address comprising the gateway address corresponding to the first relay agent;
extracting, by the border device from a first offer message identifier field in the first offer message, the first identifier corresponding to the first client device;
querying, by the border device, the map server for a first location address corresponding to the extracted first identifier corresponding to the first client device;

encapsulating, by the border device, the first offer message; and forwarding, by the border device, the encapsulated first offer message over the network to the first location address.

12. The method of claim 10, further comprising:

decapsulating, by the border device, the encapsulated second discovery message;

forwarding, by the border device, the decapsulated second discovery message to the dynamic host configuration protocol (DHCP) server;

receiving, by the border device in response to forwarding the decapsulated second discovery message to the DHCP server, a second offer message having a second offer message destination address comprising the gateway address corresponding to the second relay agent;

extracting, by the border device from a second offer message identifier field in the second offer message, the second identifier corresponding to the second client device;

querying, by the border device, the map server for a second location address corresponding to the extracted second identifier corresponding to the second client device;

encapsulating, by the border device, the second offer message; and forwarding, by the border device, the encapsulated second offer message over the network to the second location address.

13. The method of claim 10, wherein registering the first identifier comprises registering the first identifier comprising a media access control (MAC) address of the first client device.

14. The method of claim 10, wherein registering the second identifier comprises registering the second identifier comprising a media access control (MAC) address of the second client device.

15. An apparatus comprising:

a memory storage; and a processing unit coupled to the memory storage, wherein the processing unit is operative to:

receive a first discovery message associated with a first client device, the first discovery message including a first discovery message identifier field comprising a first identifier corresponding to a first client device, wherein the first client device is associated with a subnet;

register, with a map server, the first identifier with an address of a first network device in which the processing unit is disposed;

add a gateway address corresponding to the first relay agent to the first discovery message, the gateway address being in an Endpoint Identification (EID) space;

encapsulate the first discovery message;

forward the encapsulated first discovery message over a network to a border device destine to a dynamic host configuration protocol (DHCP) server having an address not in the EID space, wherein;

the encapsulated first discovery message is decapsulated;

the decapsulated first discovery message is forwarded to a dynamic host configuration protocol (DHCP) server having an address not in the EID space;

in response to forwarding the decapsulated first discovery message to the DHCP server, a first offer message having a first offer message destination address comprising the gateway address corresponding to the first relay agent and a first offer message identifier field comprising the first identifier is received;

the first identifier corresponding to the first client device is extracted from a first offer message identifier field in the first offer message;

the map server is queried for a first location address corresponding to the extracted first identifier corresponding to the first client device;

the first offer message is encapsulated; and the encapsulated first offer message is forwarded over the network to the first location address.

16. The apparatus of claim 15, wherein the first identifier comprises a media access control (MAC) address of the first client device.

17. The apparatus of claim 15, wherein the first discovery message identifier field comprises a CHADDR field.

18. The apparatus of claim 15, wherein the address of the first network device comprises a locator address of the first network device.

19. The apparatus of claim 15, wherein the address of the first network device comprises an internet protocol (IP) address of the first network device.

20. The apparatus of claim 15, wherein the processing unit being operative to encapsulate the first discovery message comprises the processing unit being operative to Locator/ID Separation Protocol (LISP) encapsulate the first discovery message.

* * * * *